United States Patent Office 3,681,290
Patented Aug. 1, 1972

3,681,290
AROMATIC DIAMINES CONTAINING ESTER GROUPS AND THE PRODUCTION OF POLYURETHANE ELASTOMERS THEREFROM
Walter Meckel, New Martinsville, W. Va., and Erwin Muller, Leverkusen, Germany, assignors to Farbenfabriken Bayer Aktiengesellschaft, Leverkusen, Germany
No Drawing. Continuation-in-part of application Ser. No. 866,373, Oct. 14, 1969. This application Feb. 2, 1971, Ser. No. 112,027
Claims priority, application Germany, Jan. 28, 1970, P 20 03 706.3
Int. Cl. C08g 22/04
U.S. Cl. 260—77.5 AM    19 Claims

ABSTRACT OF THE DISCLOSURE

Novel aromatic diamines containing ester groups wherein the amino groups are in the m- and/or p-position relative to the ester group, and with a substituent in the o-position to at least one amino group are useful to prepare polyurethane elastomers therefrom with an organic diisocyanate and an organic compound containing at least two hydroxyl groups and having a molecular weight of from about 800 to about 5000, and if desired an organic compound containing at least two hydroxyl groups and having a molecular weight of from about 50 to about 500.

---

This is a continuation-in-part of copending application Ser. No. 866,373, filed Oct. 14, 1969 and relates to novel aromatic diamines and to elastomeric polyurethanes prepared therefrom. More particularly, this invention relates to aromatic diamines containing ester groups and to elastomeric polyurethanes prepared therefrom and having good tensile strength and elasticity.

This invention relates to aromatic diamines containing ester groups in which the amino groups are in the m- and/or p-position relative to the ester group, and with a substituent in the o-position to at least one amino group. Preferred substituents include halogen atoms, such as, fluorine, chlorine, bromine or iodine, among which chlorine is particularly preferred, and alkoxy radicals containing from 1 to 4 carbon atoms.

Diamines of this invention include those having the formula

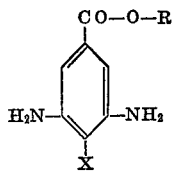

wherein R represents an alkyl radical having from 1 to 20 carbon atoms which optionally can contain oxygen atoms, an aryl-, aralkyl- or cycloalkyl radical and X represents an alkoxy radical having from 1 to 4 carbon atoms or a halogen atom; those having the formula

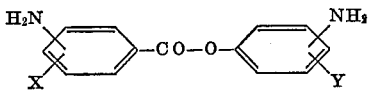

wherein X represents a hydrogen or halogen atom and Y represents a halogen atom; those having the formula

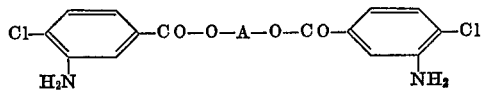

wherein A represents an alkylene radical having from 2 to 6 carbon atoms which may be optionally branched and/or contain oxygen, sulfur or —N(R)—(R=$C_1$-$C_4$-alkyl)

atoms; those having the formula

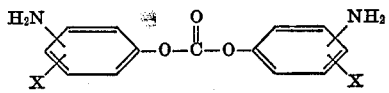

wherein each X represents halogen and in which at least one substituent X is in the o-position to the amino group; and those having the formula

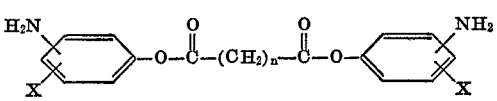

wherein $n$ represents a number of from 0 to 4 and X represents halogen and in which at least one substituent X is in the o-position to the amino group.

More specific examples of such compounds are those having the formula

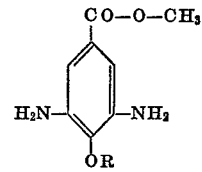

wherein R represents —$CH_3$, —$C_2H_5$, —$C_3H_7$ or —iso-$C_3H_7$; those having the formula

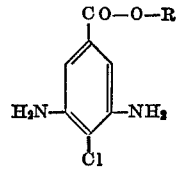

wherein R represents

—$CH_3$, —$C_2H_5$, n-, iso-$C_3H_7$, n-, iso-$C_4H_9$ $C_5H_{11}$, iso-$C_5H_{11}$, —$C_6H_{13}$, —CH(CH$_3$)(CH$_2$—CH(CH$_3$)$_2$)

—CH$_2$—CH—(C$_2$H$_5$)$_2$, —C$_7$H$_{15}$, —C$_8$H$_{17}$, —CH$_2$—CH(C$_2$H$_5$)(C$_4$H$_9$)

—CH$_2$—C(CH$_3$)$_2$—C$_2$H$_5$, —CH$_2$—CH$_2$—C(CH$_3$)$_2$—C$_4$H$_9$, —C$_{10}$H$_{21}$

—$C_{12}H_{25}$, —$C_{14}H_{29}$, —$C_{16}H_{33}$, —$C_{18}H_{37}$, —$C_6H_5$, —$C_6H_{11}$

—$C_6H_4$—C(CH$_3$)$_3$, —CH$_2$CH$_2$—O—$C_4H_9$

—CH$_2$—CH$_2$—O—CH(CH$_3$)$_2$ or —CH$_2$—CH$_2$—O—CH$_2$—CH$_2$—O—$C_4H_9$ the compound having the formula

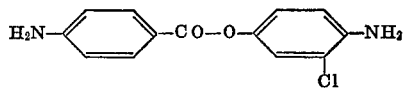

the compound having the formula

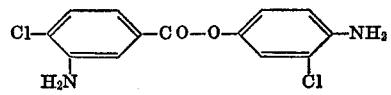

the compounds having the formula

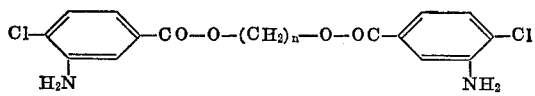

wherein *n* represents a number of from 2 to 6, the compound having the formula

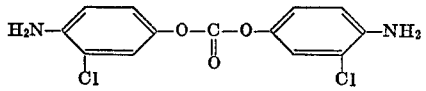

and the compounds having the formula

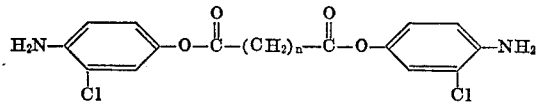

wherein *n* represents a number of from 0 to 4.

The new aromatic diamines containing ester groups may be prepared by generally known processes. For example, diamines having the general formula

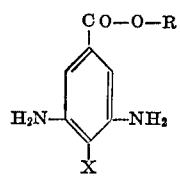

wherein X and R are as defined above, can be obtained by reacting corresponding dinitrobenzoic acids of the formula

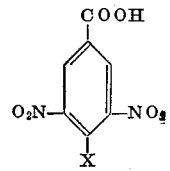

or their acid halides with alcohols of the formula R—OH and subsequently hydrogenating the nitro groups by generally known methods, such as, for example, by catalytic hydrogenation.

Compounds having the formula

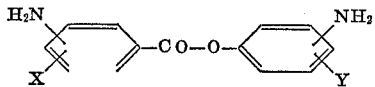

wherein X and Y are as defined above, can be obtained, for example, by reacting nitrobenzoic acids of the formula

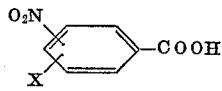

or their acid halides with nitrophenols corresponding to the formula

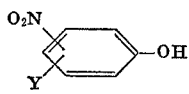

and subsequently hydrogenating the nitro groups into amino groups by generally known methods.

Diamines having the formula

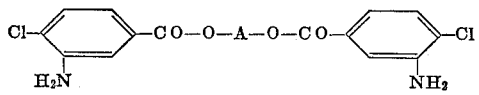

wherein A is as defined above, can be obtained, for example, by reacting 3-nitro-4-chlorobenzoic acid with alcohols of the formula HO—A—OH, such as, for example, with ethylene glycol, diethylene glycol, 1,4-butane diol, dipropylene glycol, bis-β-hydroxy ethylsulphide or N-methyl diethanolamine, accompanied by esterification. However, 4-chloro-3-nitrobenzoic acid chloride, may alternatively be reacted with the aforementioned diols by the Schotten-Baumann method. The reaction is again followed by catalytic hydrogenation of the nitro groups into amino groups.

Compounds having the formula

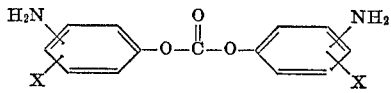

wherein X is as defined above, can be obtained, for example, by reacting phenols corresponding to formula

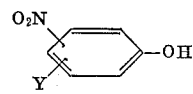

for example, with diphenyl carbonate or phosgene, by generally known methods, and subsequently hydrogenating the resulting dinitrodiphenyl carbonates.

Compounds having the formula

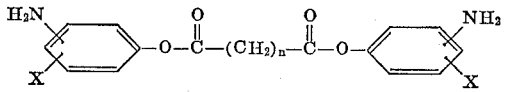

wherein X and *n* are as defined above, may also be obtained in a generally known manner by reacting nitrophenols corresponding to the formula

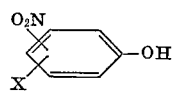

by the Schotten-Baumann method with dicarboxylic acid dihalides, such as, for example, with oxalyl chloride, succinic acid dichloride and glutaric acid dichloride, in the presence of aqueous sodium hydroxide, or by thermally esterifying the aforementioned dicarboxylic acids with the corresponding nitrophenols. The nitro groups are subsequently hydrogenated into amino groups by generally known methods, such as, for example, in solvents such as methanol or dioxane, optionally in the presence of catalysts, such as, for example, Raney nickel or platinum.

The following are examples of the novel compounds according to the invention:

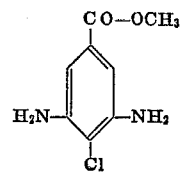 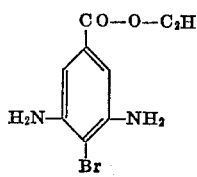 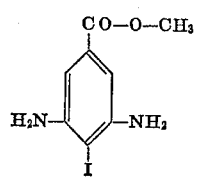 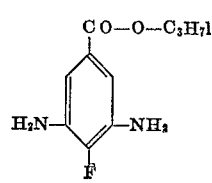

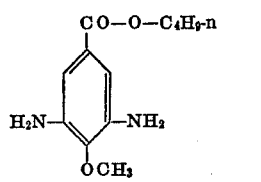 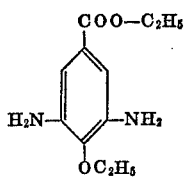 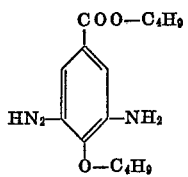 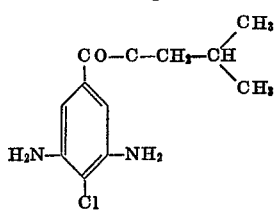
preferred
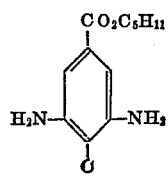 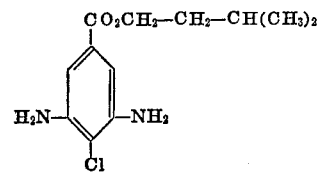 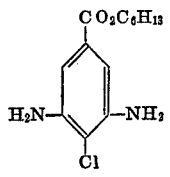
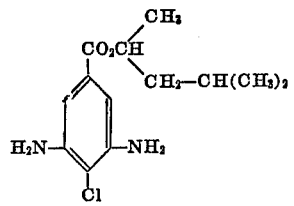 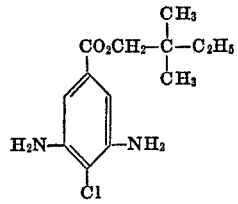 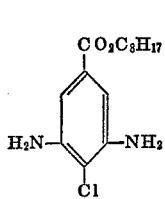
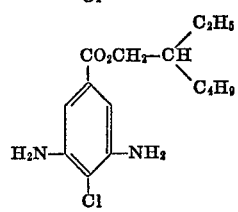
preferred
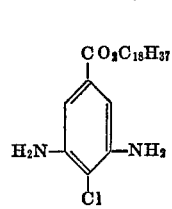 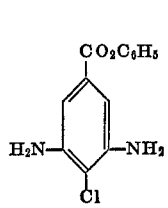
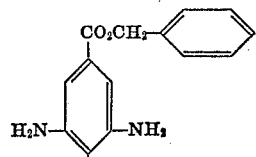 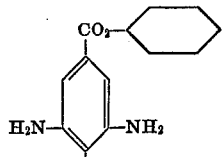 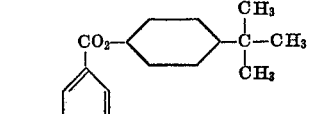
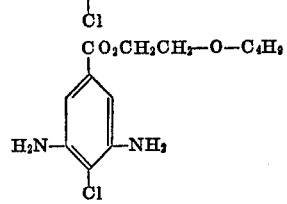 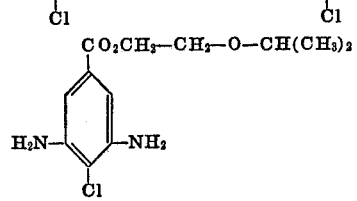
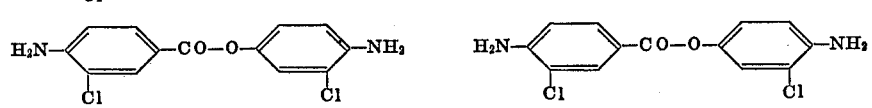
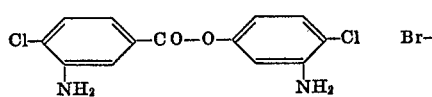 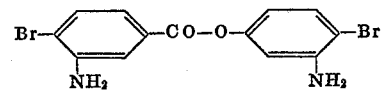
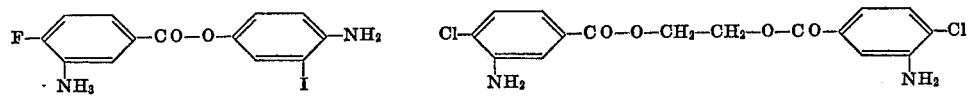
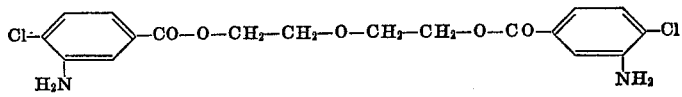
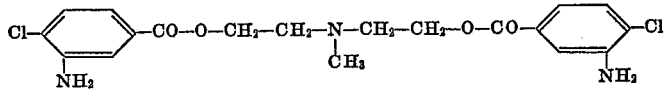
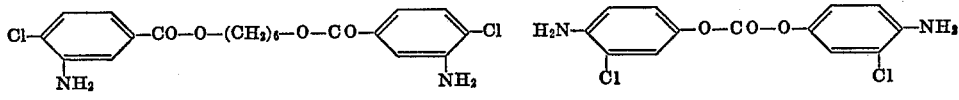

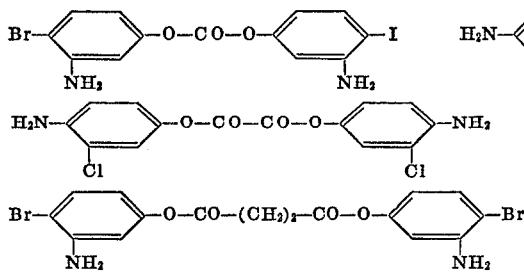
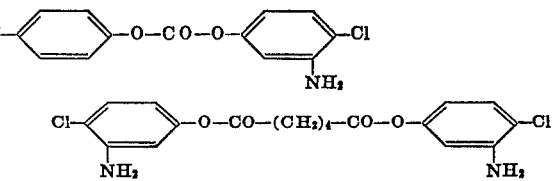

Generally, the novel diamine compounds may be used, for example, as starting materials in the production of dyes and plant protection agents.

The compounds have proved to be particularly valuable as chain extending agents in the production of plastics with elastomeric properties by the conventional isocyanate-polyaddition process.

Accordingly, this invention also relates to a process for the production of polyurethane elastomers from an organic compound containing at least two hydroxyl groups reactive with isocyanate groups and having a molecular weight of from about 800 to about 5,000, an organic diisocyanate and an aromatic diamine as chain-extender, wherein the aromatic diamine contains an ester group, the amino groups are in the m- and/or p-position to the ester group, and with a substituent in the o-position to at least one amino group.

If it is desirable to prepare hard polyurethane elastomers, i.e., those having a Shore D hardness of from about 40 to about 90, it is particularly advantageous to use in addition to the foregoing reactants an organic compound containing at least two hydroxyl groups reactive with isocyanates and having a molecular weight of from about 50 to about 500.

Preferred chain-extending agents are diamines of the kind in which the amino groups are in the m- or p-position to the ester group and having a halogen substituent, preferably chlorine, or an alkoxy substituent having from 1 to 4 carbon atoms in the o-position to at least one amino group.

Further preferred diamines to be used as chain extenders are those derived from 4-chloro - 3,5 - diamino benzoic acid by esterification with linear or branched higher alcohols, which may contain hetero atoms, with phenols, araliphatic alcohols or cycloaliphatic alcohols. Considerable advantage of the diamines according to the invention resides in the fact that, by suitable choice of the alcohols, the melting point of the diamines can be modified so that liquid products result the handling of which offers advantages, since melting is not required. Diamines representing particularly preferred chain-extending agents for the purpose of this invention include those having the formula

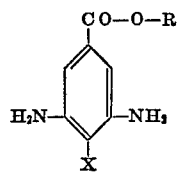

wherin R represents an alkyl radical having from 1 to 20 carbon atoms which optionally can contain oxygen atoms, and aryl-, aralkyl- or cycloalkyl radical and X represents an alkoxy radical having from 1 to 4 carbon atoms or halogen; those having the formula

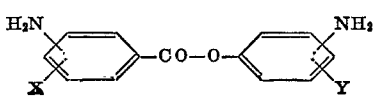

wherein X represents a hydrogen or halogen atom and Y represents a halogen atom; those having the formula

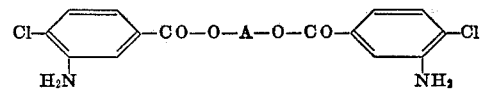

wherein A represents an alkylene radical having from 2 to 6 carbon atoms which may be optionally branched and/or contain oxygen, sulfur or —N(R)— (R=C₁-C₄-alkyl) atoms; those having the formula

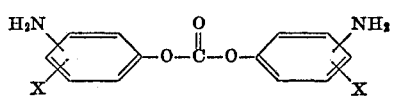

wherein each X represents halogen and in which at least one substituent X is in the o-position to the amino group; those having the formula

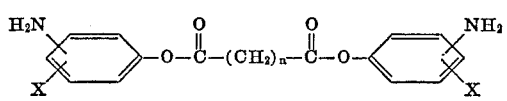

wherein $n$ represents a number of from 0 to 4 and each X represents halogen and in which at least one substituent X is in the o-position to the amino group; those having the formula

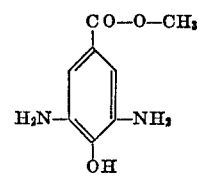

wherein R represents —CH₃, —C₂H₅, —C₃H₇ or —iso-C₃H₇; those having the formula

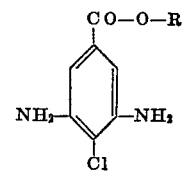

wherein R represents

—CH₃, —C₂H₅, n-, iso-C₃H₇, n-, iso-C₄H₉;

C₅H₁₁, iso-C₅H₁₁, —C₆H₁₃, —CH(CH₃)(CH₃—CH(CH₃)₂)

—CH₂—CH—(C₂H₅)₂, —C₇H₁₅, —C₈H₁₇, —CH₂—CH(C₂H₅)(C₄H₉)

—CH₂—C(CH₃)₂—C₂H₅, —CH₂—CH₂—C(CH₃)₂—C₄H₉, —C₁₀H₂₁, —C₁₂H₂₅

—C₁₄H₂₉, —C₁₆H₃₃, —C₁₈H₃₇, —C₆H₅, —C₆H₁₁, —C₆H₄—C(CH₃)₃

—CH₂CH₂—O—C₄H₉, —CH₂—CH₂—O—CH(CH₃)₂ or —CH₂—CH₂—O—CH₂—CH₂—O—C₄H₉ those having the formulae

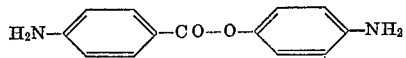
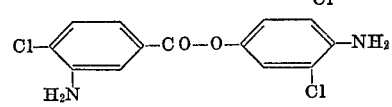

or

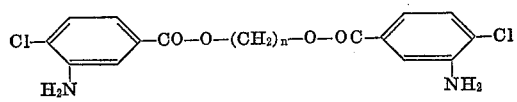

wherein n represents a number of from 2 to 6; and those having the formulae

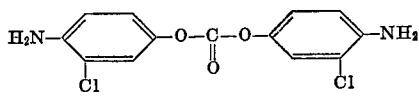

and

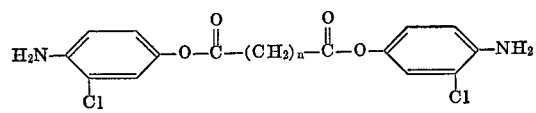

wherein n represents a number of from 0 to 4.

Suitable starting materials for the production of elastomeric polyurethanes according to this invention include those organic compounds with at least two hydroxyl groups reactive with isocyanate groups and having molecular weights of from about 800 to about 5,000, preferably with molecular weights of from about 1,000 to about 3,000.

Any suitable hydroxyl polyester may be used such as linear or slightly branched polyesters obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, diethylsuccinic acid, isophthalic acid, terephthalic acid, 1,4-cyclohexanedicarboxylic acid, and the like as well as hydroxy carboxylic acids. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol and the like. The polyesters may contain double or triple bonds in unsaturated fatty acid moieties.

Any suitable linear or slightly branched polyhydric polyalkylene ether may be used such as, for example, the condensation product of an alkylene oxide beginning with any suitable initiator. The initiator may be difunctional compounds including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Copolymers of this type may also be used. Any suitable initiator may be used including, for example, water, polyhydric alcohols, preferably having 2 to 8 hydroxyl groups, aminoalcohols, amines preferably having 2 to 8 replaceable hydrogen atoms bonded to nitrogen atoms. Phosphorous acids may also be used, but the phosphorus compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. 1,922,459; 3,009,939 and 3,061,625 or by the process disclosed by Wurtz in 1859 and in Encyclopedia of Chemical Technology, vol. 7, pp. 257–262, published by Interscience Publishers, Inc. (1951).

Specific examples of initiators are water, ethylene glycol, 1,2 - propylene glycol, hexane-1,6 - diol, ammonia, ethanolamine, tripropanolamine, diethanolpropanolamine, tributanolamine, 2,4 - tolylene diamine, 4,4' - diphenylmethane diamine, p,p',p'' - triphenylmethane triamine, ethylene diamine, propylene diamine, propylene triamine, N,N,N',N' - tetrakis-(2-hydroxypropyl)ethylene diamine, diethylene triamine and the like. A proportion of a trifunctional starting component, such as trimethylol propane or glycerol, may also be optionally used. It is of course also possible to use mixtures of linear and/or slightly branched polyalkylene glycol ethers of different types.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable organic diisocyanate may be used in the process of the present invention including aromatic, aliphatic and heterocyclic diisocyanates. In other words, two isocyanate radicals may be bonded to any suitable divalent organic radical to produce the organic diisocyanates which are useful in accordance with the present invention including acyclic, alicyclic, aromatic and heterocyclic radicals. Suitable organic polyisocyanates are therefore ethylene diisocyanate,
ethylidene diisocyanate,
propylene-1,2-diisocyanate,
cyclohexylene-1,2-diisocyanate,
m-phenylene diisocyanate,
2,4-tolylene diisocyanate,
2,6-tolylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
1,5-naphthalene diisocyanate, furfurylidene diisocyanate and the like.

Examples of preferred diisocyanates include aliphatic diisocyanates, having the general formula $$OCN—(CH_2)_n—NCO$$

wherein $n$ represents a number from 2 to 8; cycloaliphatic diisocyanates, such as hexahydrotolylene-2,4- and 2,6-diisocyanate and mixtures of these isomers, or dicyclohexyl methane diisocyanate, araliphatic diisocyanates such as 1,3-xylylene diisocyanate, and aromatic diisocyanates such as tolylene-2,4- or 2,6-diisocyanate and mixtures of these isomers such as a mixture of 80% 2,4-tolylene diisocyanate and 20% 2,6-tolylene diisocyanate, phenylene-1,4-diisocyanate, diphenylmethane-4,4' - diisocyanate, diphenyl ether 4,4' - diisocyanate, naphthylene - 1,5-diisocyanate and the like. Isophorone diisocyanate and ester diisocyanates of carboxylic acids of the kind described, for example, in British patent specification No. 965,474, may also be used as diisocyanates in accordance with the invention. Proportions of triisocyanates such as, p,p',p"-triphenyl methane triisocyanate may be used.

A preferred isocyanate is 2,4 - tolylene diisocyanate, however, mixtures of diisocyanates may also be used although it is desirable that at least about 50 percent of all of the diisocyanates present have isocyanate groups of different reactivities. Isomeric mixtures of 2,4- and 2,6-tolylene diisocyanate are particularly preferred.

Some preferred compounds which contain at least two hydroxyl groups reactive with isocyanate groups and having a molecular weight of from about 50 to about 500 are slightly branched diols, such as, for example, neopentyl glycol, 1,2 - propylene glycol, 1,3 - butylene glycol and the like. Diols which contain hetero atoms, such as, for example, diethylene glycol, triethylene glycol, dipropylene glycol, tripropylene ether glycol-(1,2), thiodiglycol and the like are also suitable. In addition, it is often desirable to add up to about 25 percent by weight of hydroxyl compounds which contain at least three hydroxyl groups, such as, for example, trimethylol propane, to the low molecular weight diols. The compounds containing at least two hydroxyl groups and having a molecular weight of from about 50 to about 500 are preferably used in the form of isocyanate containing reaction products which are obtained by carrying out the reaction with an excess of diisocyanate.

Generally, the quantities in which the reactants are used are selected in such a way that the molar ratio of diisocyanate to chain extender plus the compound containing reactive hydroxyl groups, which is governed by the particular processing method used, is generally from 1.0 to 1.5 and preferably from 1.05 to 1.25.

It is most desirable that the proportion of hydroxyl content to diisocyanate be such that the amount of free diisocyanate contained in the resulting prepolymer is less than 10 percent by weight, and most preferably, each mol of hydroxyl should be reacted with not more than about 1.1 mol of diisocyanate.

The molar ratio of $NH_2$— groups in the chain-extender to reactive OH groups may vary within wide limits, although it is preferably from 0.4 to 1.5, producing soft to hard types of polyurethanes, however, the proportion of NCO groups in the prepolymer to the amino groups of the chain lengthening agent should be between about 0.8 and about 2.5, preferably between about 1.0 and about 1.3.

The process according to this invention may be carried out in many suitable and different ways. For example, the compound containing at least two hydroxyl groups may be reacted with an excess of diisocyanate and, after the diamine chain-extender of the invention has been added, the resulting melt is poured into molds. After heating for several hours, a high grade elastic polyurethane plastic is obtained.

The amine chain-extenders are preferably added to the prepolymers in liquid form at temperatures of from about 50° C. to about 140° C., preferably from about 80° C. to about 120° C., and after thorough mixing, the melt is poured into preheated molds. The molded products are removed after about 10 minutes and after about 10 hours storage at about 100° C. they attain their final mechanical properties.

In another embodiment, the fairly high molecular weight compound containing at least two hydroxyl groups, in admixture with the diamine chain-extender of the invention, is reacted with an excess of diisocyanate, and the reaction product is molded under heat and pressure after it has been granulated. Depending upon the quantities in which the reactants are used, it is possible in this way to obtain polyurethane plastics with different degrees of hardness and elasticity. In this way, it is possible to obtain plastics which can be processed like thermoplasts.

In yet another embodiment, the relatively high molecular weight compound containing at least two hydroxyl groups, in admixture with the diamine chain-extender of the invention, is reacted with a less than equivalent amount of diisocyanate, resulting in the formation of a millable sheet which may be converted in a subsequent stage, for example, by cross-linking with more diisocyanate, into an elastomeric polyurethane plastic.

In a preferred process according to the invention the compounds of molecular weight of from about 800 to about 5,000 which contain at least two hydroxyl groups and the compounds of molecular weight of from about 50 to about 500 which have at least two hydroxyl groups are reacted with the diisocyanates in such a manner that the free diisocyanate content in the reaction mixture is less than about 10% by weight before the reaction with the aromatic diamines.

According to another preferred procedure, the isocyanate component which is used consists of reaction products of the diisocyanates with the compounds of molecular weight of from about 50 to about 500 which have at least two hydroxyl groups.

According to another preferred method of procedure, the isocyanate component used consists of reaction products of the diisocyanates with neopentyl glycol, propylene glycol-(1,2), butylene glycol-(1,3), diethylene glycol, triethylene glycol, dipropylene glycol, tripropylene glycol or thiodiglycol to which a proportion of compounds having at least three hydroxyl groups may have been added.

It is also particularly advantageous to react the higher molecular weight and low molecular weight hydroxyl compounds separately from each other with a less than equivalent amount of diisocyanates at from about 30° C. to about 150° C., preferably from about 40° C. to about 100° C., and thereafter to mix the two adducts which have an NCO content of from about 2% to about 8% and from about 10% to about 25%, respectively, prepolymers which have an NCO content of from about 3% to about 20% being obtained, depending on the proportions in which the two adducts have been mixed.

The elastomeric polyurethanes obtained according to the invention are particularly valuable when the commercially available isomer mixture of 80% by weight of 2,4- and 20% by weight of 2,6-tolylene diisocyanate is used as the diisocyanate.

Although it was known that aromatic diamines containing a chlorine atom, for example, in the o-position to the amino group, may be used as chain-extenders in the production of polyurethane elastomers, it was extremely surprising that the compounds according to the invention should be excellent chain-extenders for the production of elastic polyurethanes. Since aminoesters normally undergo aminolysis at elevated temperature, the diamine compounds of the invention, which are best handled at temperatures above their melting point, had not been expected to be suitable for use as chain-extenders in the production of polyurethanes. Nevertheless, it has been found that, in comparison with elastomeric polyurethane obtained, for example, with 3,3'-dichloro-4,4-diaminodiphenyl methane as chain extender, polyurethane elastomers prepared with the compounds according to the invention are distinguished by their greater tensile strength and higher elasticity.

Some of the advantages of the method in which isocyanate-containing prepolymers are used as starting material, using compounds of molecular weight 50 to 5,000 which contain at least two hydroxyl groups, over the use of free diisocyanate are as follows.

(1) Since the prepolymers contain very little if any unreacted diisocyanates, they are physiologically harmless since, when using readily volatile diisocyanates, the vapor pressure of the free diisocyanate is considerably reduced by doubling the size of the molecule with the low molecular diol.

(2) The pot life of the mixture of prepolymers with chain lengthening agent is greatly increased since, by using diisocyanates with NCO groups of different reactivities, the reactive NCO groups have already undergone reaction during prepolymer formation. When using prepolymers which have a high free diisocyanate content, this pot life is too short for casting to produce large molded products of great hardness.

(3) In spite of their high content in urea and urea groups, the molded products obtained are transparent whereas when substantial quantities of free diisocyanates are used in the prepolymer the elastomers obtained are cloudy due to the presence of crystallized urea segments.

(4) For a given NCO number in the prepolymer, the process according to the invention results in a higher Shore hardness (D scale) which is higher by about 7 units.

(5) Since only a small amount of reactive isocyanate groups are present, the prepolymers are characterized by increased stability in storage.

The products according to the invention may be used for a variety of purposes including, for example, the production of moldings of the kind used in machine or vehicle construction, for example, in the manufacture of gear rings, V-belts, gear wheels, bearing shells, seals, diaphragms and the like. The polyurethanes may be modified with the usual additives, for example, dyes, pigments or fillers if desired.

The invention is further illustrated but is not intended to be limited by the following examples in which all parts and percentages are by weight unless otherwise specified.

EXAMPLE 1

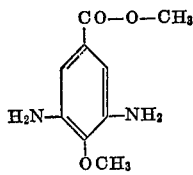

About 1 mol of potassium hydroxide is dissolved in about 800 ml. of methanol. About 1 mol of 4-chloro-3,5-dinitrobenzoic acid methyl ester is added in portions with cooling. The reaction mixture is then heated under reflux until the reaction is at an end, as shown by a change in the originally violet color to yellow. 4-methoxy-3,5-dinitrobenzoic acid methyl ester crystallizes out on cooling. Yield: 205 g. M.P. 53° C.–55° C.

About 100 parts of this compound are hydrogenated with 20 parts of Raney nickel "B" in about 400 ml. of dioxan. About 70 parts of 4-methoxy-3,5-diaminobenzoic acid methyl ester melting at 157° C.–158° C. are obtained following recrystallization from methanol.

Calculated (percent): C, 55.1; H, 6.2; N, 14.3. Found (percent): C, 55.2; H, 5.4; N, 14.2.

EXAMPLE 2

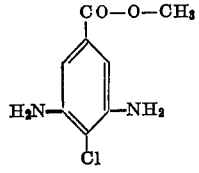

About 200 parts of 4-chloro-3,5-dinitrobenzoic acid methyl ester, which can be obtained by nitrating chlorobenzoic acid at about 120° C.–140° C. and esterifying the resulting 4-chloro-3,5-dinitrobenzoic acid with methanol, are hydrogenated at room temperature with 40 parts of Raney nickel and 30 parts of sodium bicarbonate in about 500 ml. of dioxan. About 140 parts of 4-chloro-3,5-diaminobenzoic acid methyl ester melting at 128° C.–129° C. are obtained after recrystallization from methanol/water.

Calculated (percent): C, 47.9; H, 4.5; N, 14.0; Cl, 17.6. Found (percent): C, 47.8; H, 4.7; N, 13.9; Cl, 17.7.

EXAMPLE 3

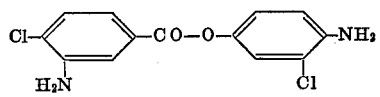

About 1 mol of 4-chloro-3-nitrobenzoyl chloride dissolved in about 200 ml. of acetone are added dropwise in a nitrogen atmosphere at about 20° C. to about 40° C. to a solution of about 1 mol of 3-chloro-4-nitrophenol in 1 liter of normal caustic soda solution. About 310 parts of 4-chloro-3-nitrobenzoic acid-(3'-chloro-4'-nitro)-phenyl ester melting at 157° C.–158° C. are obtained after recrystallization from toluene.

Calculated (percent): C, 43.7; H, 1.7; N, 7.9; Cl, 19.9. Found (percent): C, 43.7; H, 2.0; N, 7.8; Cl, 20.0.

About 200 parts of this compound are hydrogenated at about 20° C. to 40° C. with 40 parts of Raney nickel "B" and about 30 parts of sodium bicarbonate in about 750 ml. of dioxan. Recrystallization from dimethyl formamide/water gives 135 parts of 4-chloro-3-aminobenzoic acid-(3'-chloro-4'-amino)-phenyl ester melting at 145° C.–146° C.

Calculated (percent): C, 52.6; H, 3.3; N, 9.4; Cl, 23.9. Found (percent): C, 52.5; H, 3.7; N, 9.5; Cl, 23.5.

EXAMPLE 4

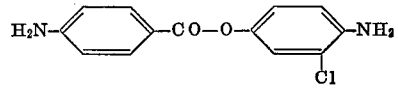

Following the procedure described in Example 3, about 260 parts of 4-nitrobenzoic acid-(3'-chloro-4'-amino)-phenyl ester melting at 157° C.–158° C. are obtained with about 1 mol of 4-nitrobenzoyl chloride.

Calculated (percent): C, 50.6; H, 2.3; N, 9.1; Cl, 11.5. Found (percent): C, 50.4; H, 2.5; N, 9.0; Cl, 11.3.

About 120 parts of 4-aminobenzoic acid-(3'-chloro-4'-amino)-phenyl ester are obtained by hydrogenating this compound in accordance with the procedure described in Example 3. M.P. 138° C.–140° C.

Calculated (percent): C, 59.5; H, 4.2; N, 10.7; Cl, 13.5. Found (percent): C, 59.8; H, 4.3; N, 10.8; Cl, 13.4.

EXAMPLE 5

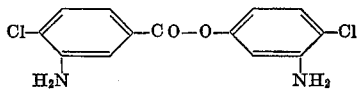

Following the procedure described in Example 3, about 285 parts of 4-chloro-3-nitrobenzoic acid-(4'-chloro-3'-nitro)-phenyl ester melting at 128° C. are obtained with about 1 mol of 4-chloro-3-nitrophenol.

Calculated (percent): C, 43.7; H, 1.7; N, 7.8; Cl, 19.9. Found (percent): C, 43.5; H, 2.0; N, 7.8; Cl, 20.0.

About 140 parts of 4-chloro-3-aminobenzoic acid-(4'-chloro-3'-amino)-phenyl ester are obtained by hydrogenation in accordance with the procedure described in Example 3. M.P. 147° C.–148° C.

Calculated (percent): C, 52.6; H, 3.3; N, 9.4; Cl, 23.9. Found (percent): C, 52.8; H, 3.7; N, 9.5; Cl, 23.5.

EXAMPLE 6

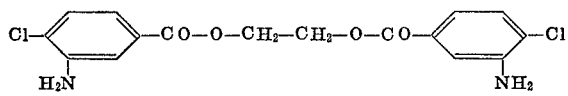

About 2 mols of 4-chloro-3-nitrobenzoic acid are heated under nitrogen for about 8 hours at about 100° C. with about 1 mol of ethylene glycol and about 1 ml. of about 36% hydrochloric acid, and then for about 5 hours at about 160° C. The dinitro compound formed (about 350 parts) melts at 160° C. after recrystallization from benzene.

Calculated (percent): C, 44.8; H, 2.4; N, 6.7, Cl, 16.6. Found (percent): C, 45.1; H, 2.6; N, 6.3; Cl, 16.7.

Following hydrogenation in accordance with the procedure described in Example 2, ethylene glycol-bis-(4-chloro-3-amino)-benzoic acid ester is obtained, melting at 171° C. after recrystallization.

Calculated (percent): C, 52.1; H, 3.8; N, 7.6; Cl, 19.2. Found (percent): C, 52.4; H, 3.9; N, 7.5; Cl, 18.9.

EXAMPLE 7

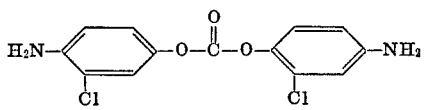

About 2 mols of 3-chloro-4-nitrophenol are dissolved under nitrogen in about 100 ml. of twice normal sodium hydroxide solution. A vigorous stream of phosgene is introduced at about 20° C. to 40° C. The 3,3′-dichloro-4,4′-dinitrodiphenyl carbonate which precipitates is suction filtered and recrystallized from toluene, M.P. 151° C.

Calculated (percent): C, 42.0; H, 1.6; N, 7.5; Cl, 19.1. Found (percent): C, 42.1; H, 1.7; N, 7.4; Cl, 19.3.

3,3′-dichloro-4,4′-diaminodiphenyl carbonate is obtained by hydrogenation in accordance with the procedure described in Example 3. M.P. 166°–168° C.

Calculated (percent): C, 49.9; H, 3.1; N, 8.9; Cl, 22.6. Found (percent): C, 50.2; H, 3.4; N, 9.1; Cl, 22.2.

EXAMPLE 8

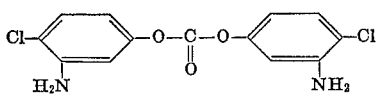

4,4′-dichloro-3,3′-dinitrodiphenyl carbonate melting at 183° C.–185° C. is prepared in accordance with the procedure described in Example 7.

Calculated (percent): C, 42.0; H, 1.6; N, 7.5; Cl, 19.1. Found (percent): C, 41.9; H, 1.8; N, 7.3; Cl, 19.1.

4,4′-dichloro-3,3′-diamino diphenyl carbonate is obtained by hydrogenation in accordance with Example 3. M.P. 192° C.–193° C.

Calculated (percent): C, 49.9; H, 3.1; N, 8.9; Cl, 22.6. Found (percent): C, 50.1; H, 3.1; N, 9.2; Cl, 22.8.

EXAMPLE 9

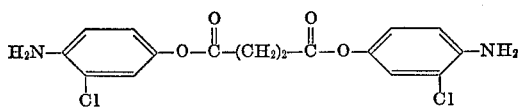

About 2 mols of 3-chloro-4-nitrophenol are dissolved in about 1000 ml. of twice normal sodium hydroxide solution, about 1 mol of succinic acid dichloride being added dropwise to the resulting solution under nitrogen at a temperature of from about 20° C. to 40° C.

The product which precipitates is filtered off under suction. Succinic acid di-(3-chloro-4-nitro)-phenyl ester melting at 96°–97° C. is obtained after drying and recrystallization from benzene/cyclohexane.

Calculated (percent): C, 44.8; H, 2.4; N, 6.5; Cl, 16.6. Found (percent): C, 45.0; H, 2.6; N, 6.3; Cl, 16.3.

Succinic acid di-(3-chloro-4-amino)-phenyl ester melting at 196° C.–198° C. (from dioxan) is obtained by hydrogenation in accordance with the procedure described in Example 3.

Calculated (percent): C, 52.1; H, 3.8; N, 7.6; Cl, 19.2. Found (percent): C, 52.1; H, 4.0; N, 7.7; Cl. 18.8.

EXAMPLE 10

About 200 parts of a polyester of adipic acid and and ethylene glycol (OH number 56) are dehydrated in vacuo for about 15 minutes at about 130° C. About 40 parts of a mixture of 80% of 2,4- and 20% of 2,6-tolylene diisocyanate are then added. After about 30 minutes, about 29.7 parts of the compound of Example 3 are added in the form of a melt. After an interval of about 20 seconds, the homogeneous melt is poured into preheated molds and heated for about another 24 hours at about 100° C. The polyurethane elastomer formed has the following mechanical properties:

Tensile strength (DIN 53504) _____kg./cm.$^2$__ 321
Breaking elongation (DIN 53504) _____percent__ 625
Permanent elongation (1 minute after tearing)
                                             percent__ 9
Intrinsic strength _____kp__ 48
Shore hardness A (DIN 53505) _____ 88
Elasticity (DIN 53512) _____percent__ 30

COMPARISON EXAMPLE

The procedure is as described in Example 10 except that about 27 parts of 3,3′-dichloro-4,4′-diaminodiphenyl methane is used as the chain-extender. The polyurethane elastomer formed shows the following mechanical properties:

Tensile strength (DIN 53503) _____kg./cm.$^2$__ 234
Breaking elongation (DIN 53504) ____percent__ 440
Permanent elongation (1 minute after tearing)
                                             percent__ 11
Intrinsic strength _____kp__ 37
Shore hardness A (DIN 53505) _____ 84
Elasticity (DIN 53512) _____percent__ 31

EXAMPLE 11

The procedure is as described in Example 10 except that about 26.2 parts of the diamine according to Example 4 is used as the chain-extender. A polyurethane elastomer with the following mechanical properties is obtained:

Tensile strength (DIN 53504) _____kg./cm.$^2$__ 333
Breaking elongation (DIN 53504) _____percent__ 645
Permanent elongation (1 minute after tearing)
                                             percent__ 7
Intrinsic strength _____kp__ 38
Shore hardness A (DIN 53505) _____ 87
Elasticity (DIN 53512) _____percent__ 30

EXAMPLE 12

The procedure is as described in Example 10, except that about 36.9 parts of the diamine according to Example 6 are used. The resulting polyurethane shows the following mechanical properties:

Tensile strength (DIN 53504) _____kg./cm.$^2$__ 322
Breaking elongation (DIN 53504) _____percent__ 683
Permanent elongation (1 minute after tearing)
                                             percent__ 6
Intrinsic strength _____kp__ 70
Shore hardness A (DIN 53505) _____ 88
Elasticity (DIN 53512) _____percent__ 27

EXAMPLE 13

The procedure is as described in Example 10 except that about 31.3 parts of the diamine according to Example 7 fused with about 20 parts of a polyester of adipic acid and ethylene glycol (OH number 56), are used. The resulting polyurethane shows the following mechanical properties:

Tensile strength (DIN 53504) _____kg./cm.$^2$__ 254
Breaking elongation (DIN 53504) _____percent__ 715
Permanent elongation (1 minute after tearing)
                                           percent__ 15
Intrinsic strength _____kp__ 40
Shore harness A (DIN 53505) _____ 80
Elasticity (DIN 53512) _____percent__ 28

EXAMPLE 14

The procedure is as described in Example 10, except that about 36.9 parts of the diamine according to Example 9 are used. A polyurethane with the following mechanical properties is obtained:

Tensile strength (DIN 53504) _____kg./cm.$^2$__ 204
Breaking elongation (DIN 53504) _____percent__ 655
Permanent elongation (1 minute after tearing)
                                           percent__ 18
Intrinsic strength _____kp__ 36
Shore hardness A (DIN 53505) _____ 85
Elasticity (DIN 53512) _____percent__ 29

EXAMPLE 15

The procedure is as described in Example 10, except that about 20.1 parts of the diamine according to Example 2 are used. An elastomeric polyurethane with the following mechanical properties is obtained:

Tensile strength (DIN 53504) _____kg./cm.$^2$__ 274
Breaking elongation (DIN 53504) _____percent__ 572
Permanent elongation (1 minute after tearing)
                                           percent__ 13
Intrinsic strength _____kp__ 52
Shore hardness A (DIN 53505) _____ 92
Elasticity (DIN 53512) _____percent__ 34

EXAMPLE 16

About 200 parts of a polyester of adipic acid and ethylene glycol (OH number 566), about 33.2 parts of a mixture of 80% of 2,4- and 20% of 2,6-tolylene diisocyanate and about 13.7 parts of 4-methoxy-3,5-diaminobenzoic acid methyl ester according to Example 1, are reacted in accordance with the procedure described in Example 10 to give a polyurethane with the following mechanical properties:

Tensile strength (DIN 53504) _____kg./cm.$^2$__ 308
Breaking elongation (DIN 53504) _____percent__ 680
Permanent elongation (1 minute after tearing)
                                           percent__ 6
Intrinsic strength _____kp__ 66
Shore hardness A (DIN 53505) _____ 85
Elasticity (DIN 53512) _____percent__ 40

EXAMPLE 17

About 200 parts of a polyester of adipic acid and ethylene glycol (OH number 56), about 31.2 parts of a mixture of 80% of 2,4- and 20% of 2,6-tolylene diisocyanate and about 12 parts of 4-chloro-3,5-diaminobenzoic acid methyl ester are reacted in accordance with Example 10 to form a polyurethane with the following mechanical porperties:

Tensile strength (DIN 53504) _____kg./cm.$^2$__ 324
Breaking elongtion (DIN 53504) _____percent__ 657
Permanent elongation (1 minute after tearing)
                                           percent__ 7
Intrinsic strength _____kp__ 52
Shore hardness A (DIN 53504) _____ 83
Elasticity (DIN 53512) _____percent__ 40

EXAMPLE 18

About 200 parts of a polytetramethylene glycol (OH number 53.5), about 38.3 parts of a mixture of 80% of 2,4- and 20% of 2,6-tolylene diisocyanate and about 28.4 parts of the diamine according to Example 3 are reacted in accordance with Example 10 to form a polyurethane showing the following mechanical properties:

Tensile strength (DIN 53504) _____kg./cm.$^2$__ 170
Breaking elongation (DIN 53504) _____percent__ 442
Permanent elongation (1 minute after tearing)
                                           percent__ 6
Intrinsic strength _____kp__ 22
Shore hardness A (DIN 53505) _____ 82
Elasticity (DIN 53512) _____percent__ 51

EXAMPLE 19

Following the procedure described in Example 18, a polyurethane with the following mechanical properties is obtained with about 26.3 parts of the diamine according to Example 4:

Tensile strength (DIN 53504) _____kg./cm.$^2$__ 238
Breaking elongation (DIN 53504) _____percent__ 535
Permanent elongation (1 minute after tearing)
                                           percent__ 10
Intrinsic strength _____kp__ 33
Shore hardness A (DIN 3505) _____ 92
Elasticity (DIN 53512) _____percent__ 52

EXAMPLE 20

About 200 parts of a polytetramethylene glycol ether (OH number 56), about 32.6 parts of a mixture of 80% of 2,4- and 20% of 2,6-tolylene diisocyanate and about 16.3 parts of the diamine according to Example 2 are reacted in accordance with the procedure described in Example 18. The resulting polyurethane has the following mechanical properties:

Tensile strength (DIN 53504) _____kg./cm.$^2$__ 110
Breaking elongation (DIN 53504) _____percent__ 858
Permanent elongation (1 minute after tearing)
                                           percent__ 10
Intrinsic strength _____kp__ 37
Shore hardness A (DIN 53505) _____ 85
Elasticity _____percent__ 50

EXAMPLE 21

Following the procedure described in Example 18, a polyurethane showing the following mechanical properties is obtained with about 31.3 parts of the diamine according to Example 7:

Tensile strength (DIN 53504) _____kg./cm.$^2$__ 168
Breaking elongation (DIN 53504) _____percent__ 560
Permanent elongation (1 minute after tearing)
                                           percent__ 10
Intrinsic strength _____kp__ 37
Shore hardness A (DIN 53505) _____ 85
Elasticity (DIN 53512) _____percent__ 50

EXAMPLE 22

About 200 parts of a polytetramethylene glycol ether (OH number 53.5), about 29.8 parts of a mixture of 80% 2,4- and 20% 2,6-tolylene diisocyanate and about 11.8 parts of the diamine according to Example 1 are reacted in accordance with the procedure described in Example 10. The resulting polyurethane has the following mechanical properties:

Tensile strength (DIN 53504) _____kg./cm.$^2$__ 108
Breaking elongation (DIN 53504) _____percent__ 495
Permanent elongation (1 minute after tearing)
                                           percent__ 7
Intrinsic strength _____kp__ 21
Shore hardness A (DIN 53505) _____ 78
Elasticity (DIN 53512) _____percent__ 56

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

EXAMPLE 23

200 g. of 4-chloro-3,5-dinitrobenzoic acid ethyl ester, which can be obtained by nitrating p-chlorobenzoic acid at 80 to 100° C. and esterifying the resulting 4-chloro-3,5-dinitrobenzoic acid with ethanol are added dropwise in the form of a solution in 1 l. of toluylene to the boiling mixture of 500 g. of water, 500 g. of iron powder, 5 g. of glacial acetic acid and 500 ml. of toluene. After neutralisation with sodium bicarbonate there are obtained 136.8. (87% of the theoretical) (melting point 135° C.) of the analytically pure 4-chloro-3,5-diaminobenzoic acid ethylester (NH-number 524) after separating of the iron sludge by cooling the toluene solution.

In analogous manner there are obtained the following compounds:

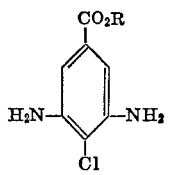

| Example | R | Melting point | NH-number Found | NH-number Calculated |
|---|---|---|---|---|
| 24 | —$C_3H_7$ | 102 | 490 | 490 |
| 25 | —CH(CH$_3$)$_2$ | 107 | 490 | 490 |
| 26 | —$C_4H_9$ | 94 | 463 | 461 |
| 27 | —CH$_2$—CH(CH$_3$)$_2$ | 91 | 462 | 461 |
| 28 | —CH(CH$_3$)($C_2H_5$) | 71 | 460 | 361 |
| 29 | —CH$_2$—CH$_2$—O—CH$_3$ | 113 | 456 | 459 |

Following the procedure described in Example 10 polyurethanes of the following properties are obtained with 0.1 mol of diamines according to Examples 23–29.

of hydrogen chloride ceases. The excess thionylchloride is distilled off and the residue esterified with 220 g. (2.2. mols) of hexanol-(1). When the evolution of hydrogen chloride has terminated the reaction product is recrystallized from 900 g. of methanol.

Yield: 603 g. (91.5%). Melting point: 51–52° C.

In a vessel of which is equipped with stirrer equipment 600 g. (1.81 mol) of 4-chloro-3,5-dinitrobenzoic acid hexylester, dissolved in 1 l. of toluene is added dropwise to a boiling mixture of 1200 g. of water, 1200 g. of iron powder, 12 of glacial acetic acid and 1 l. of toluene.

The reduction is completed after 4 hours. For neutralisation the reaction mixture is treated with 17 g. of sodium hydrogen carbonate and the water separated off in a separating funnel. After filtration and distilling of the toluene there are obtained 460 g. of a crystalline diamine. Pure 4-chloro-3,5-diaminobenzoic acid hexylester is obtained after recrystallisation from a mixture of 400 g. of benzene and 80 g. of cyclohexane.

Yield: 388 g. (83%). Melting point: 81–83° C. NH$_2$ number: 430.

In analogous manner the following diamines are obtained:

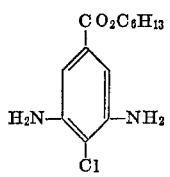

| Example | R | Melting point (° C.) | NH$_2$-number |
|---|---|---|---|
| 38 | —CH(CH$_3$)(CH$_2$—CH=(CH$_3$)$_2$) | Oil | 403 (theoretical 414). |
| 39 | —CH($C_2H_5$)(CH$_2$—C$_4$H$_9$) | Oil | 379 (theoretical 375). |
| 40 | —$C_{18}H_{37}$ | 87 | 260 (theoretical 255). |
| 41 | —$C_6H_5$ | 142 | 430 (theoretical 427). |
| 42 | —CH$_2$—$C_6H_5$ | 107 | 410 (theoretical 460). |
| 43 | —⟨H⟩—C(CH$_3$)$_3$ | 180 | 350 (theoretical 346). |
| 44 | —CH$_2$—CH$_2$—O—$C_4H_9$ | 58 | 395 (theoretical 391). |

| Example | Amine, g. | Tensile strength, kg./cm.$^2$ (DIN 53504) | Breaking elongation, percent (DIN 53504) | Permanent elongation after tearing, percent | Intrinsic strength, kp. | Shore-hardness A/D (DIN 53505) | Elasticity, percent (DIN 53512) |
|---|---|---|---|---|---|---|---|
| 30 | 21.5 g. acc., Example 23 | 319 | 627 | 16 | 55 | 92/38 | 36 |
| 31 | 22.8 g. acc., Example 24 | 341 | 602 | 12.5 | 46.5 | 93/41 | 34 |
| 32 | 22.8 g. acc., Example 25 | 365 | 607 | 11 | 73 | 93/42 | 35 |
| 33 | 24.3 g. acc., Example 26 | 322 | 613 | 17.5 | 61 | 93/38 | 34 |
| 34 | 24.3 g. acc., Example 27 | 355 | 637 | 16 | 63 | 90/40 | 33 |
| 35 | 24.3 g. acc., Example 28 | 342 | 602 | 14 | 59 | 93/39 | 35 |
| 36 | 24.45 g. acc., Example 29 | 355 | 585 | 9.5 | 51 | 92/40 | 34 |

EXAMPLE 37

$CO_2C_6H_{13}$ — H$_2$N—⟨ ⟩—NH$_2$ — Cl 493 g. (2 mols) of 4-chloro-3,5-dinitrobenzoic acid are suspended in 500 ml. of benzene.

357 g. of thionylchloride are slowly added dropwise at 70 to 80° C. and the mixture is refluxed upon the addition of 10 g. of dimethylformamide until the evolution

Production of the polyurethane elastomers 200 g. of a polyester of adipic acid and ethylene glycol (OH number 56) are dehydrated at 130° C. for 10 minutes in a water jet vacuum.

40 g. of a mixture consisting of 80% of 2,4-toluene-diisocyanate and 20% of 2,6-toluene-diisocyanate are added and the mixture is stirred for another 30 minutes. The melt is then cooled to 110° C. and degasified for 1 minute by the application of a vacuum.

0.1 mol of the amines according to the invention are added in liquid form. After an interval of 20 seconds the melt is poured into a preheated mould and the rapidly hardening moulding is heated at 100° C. for another 24 hours.

Mechanical properties:

| Example | Diamine, g. | Tensile strength, kg./cm.² (DIN 53504) | Breaking elongation, percent | Permanent elongation after tearing, percent | Intrinsic strength, kp. | Shore-hardness A/D (DIN 53505) | Elasticity percent (DIN 53512) |
|---|---|---|---|---|---|---|---|
| 45 | 26.05 g. acc., Example 37 | 341 | 620 | 18 | 44 | 93/35 | 36 |
| 46 | 27.05 g. acc., Example 38 | 336 | 573 | 8 | 43 | 88/— | 35 |
| 47 | 29.85 g. acc., Example 39 | 356 | 620 | 18 | 43 | 91/34 | 34 |
| 48 | 43.85 g. acc., Example 40 | 277 | 600 | 35 | 32 | 92/39 | 37 |
| 49 | 28.65 g. acc. | 338 | 665 | 19 | 43 | 91/40 | 37 |

EXAMPLE 50

About 200 parts of a polyester of adipic acid and ethylene glycol (OH number 56), about 63.3 parts of 2,4-tolylene diisocyanate and about 57.5 parts of 4-chloro-3,5-diaminobenzoic acid isobutylester according to Example 27, are reacted in accordance with the procedure described in Example 10 to give a polyurethane with the following mechanical properties.

Tensile strength (DIN 53504) _____kg./cm.² __ 321
Breaking elongation (DIN 53504) _____percent__ 445
Permanent elongation (1 minute after tearing) _____percent__ 35
Intrinsic strength _____kp__ 43
Shore hardness D (DIN 53505) _____ 55
Elasticity (DIN 53512) _____percent__ 40

EXAMPLE 51

About 1200 parts of a polyester of adipic acid and ethylene glycol (OH number 59) are melted at about 130° C. under nitrogen and dehydrated at 130° C.

About 224 parts of 2,4-tolylene diisocyanate are added at about 60° C. with stirring. After about 24 hours storage at about 60° C., a prepolymer which has an NCO content of about 3.95% (based on parts of NCO per part of prepolymer) and a viscosity of about 900 cp. at about 90° C. (measured in a Hoppler viscosimeter) is obtained.

EXAMPLE 52

About 106 parts (1 mol) of diethylene glycol are added dropwise to about 380 parts of 2,4-tolylene diisocyanate under nitrogen at from about 40° C. to about 50° C. The reaction is terminated after about 2 hours. The prepolymer obtained has an NCO content of about 20.8%.

EXAMPLE 53

A prepolymer which has an NCO content of about 12% and viscosity of about 700 cp. at about 90° C. is obtained by mixing the prepolymer according to Example 52 with about 535 parts of the prepolymer according to Example 51. The following prepolymers are obtained in a manner analogous to Examples 52 and 53 by varying the low molecular weight diol.

TABLE 1

| Example | Mol of diol | NCO content of the adduct, percent | Part of prepolymer according to Example 1 | NCO content of the mixture Percent | viscosity Cp. 90° C. |
|---|---|---|---|---|---|
| 54 | Neopentylglycol | 20.3 | 2,900 | 5.9 | 850 |
| 55 | Triethylene glycol | 18.8 | 2,940 | 6 | 800 |
| 56 | 1,2-propylene glycol | 20.9 | 2,820 | 6.0 | 820 |
| 57 | Dipropylene glycol | 19.3 | 2,850 | 5.9 | 780 |
| 58 | Thiodiglycol | 19.8 | 480 | 12.5 | 600 |

EXAMPLE 59

About 170 parts of the prepolymer of Example 53 are degasified under vacuum at about 100° C. About 53.1 parts of isobutyl 4-chloro-3,5-diamino-benzoate are added in the form of a melt. The mixture is homogenized for about 40 seconds and then poured into a mold which is heated to about 100° C.

The transparent molded product can be removed from the mold after about 10 minutes at about 100° C., and after about 24 hours storage at about 100° C. it has the following chemical properties.

Tensile strength (DIN 53504) _____kg. wt./cm.² __ 640
Elongation at break (DIN 53504) _____percent__ 400
Shore hardness D (DIN 53505) _____ 85
Elasticity (DIN 53512) _____percent__ 44

The mechanical properties shown in Table 3 are obtained in analogous manner by mixing the prepolymers of Examples 51 and 52 according to the recipes shown in Table 2.

TABLE 2

| | Parts of prepolymer of Example— | | Parts of isobutyl 4-chloro-3,5-diamino-benzoate |
|---|---|---|---|
| | 2 | 1 | |
| Example: | | | |
| 60 | 19.2 | 150 | 14.4 |
| 61 | 25.1 | 150 | 27.6 |
| 62 | 31.6 | 150 | 30.4 |
| 63 | 54.2 | 130 | 41.4 |

TABLE 3

| | Tensile strength [1] (kg. wt./cm.²) | Elongation at break [1] (percent) | Shore hardness D (DIN 53505) | Elasticity (DIN 53512) (percent) |
|---|---|---|---|---|
| Example: | | | | |
| 60 | 711 | 579 | 52 | 38 |
| 61 | 721 | 548 | 56 | 40 |
| 62 | 676 | 493 | 59 | 39 |
| 63 | 666 | 481 | 72 | 45 |

[1] DIN 53504.

In Example 61, the pot life of the mixture of prepolymer with chain lengthening agent is about 150 seconds, whereas when the following recipe is used, the pot life is only about 30 seconds. The times for removal from the mold are in most cases from about 400 to about 500 seconds.

Comparison example

A mixture of about 191 parts of the prepolymer of Example 51 and about 9 parts of 2,4-tolylene diisocyanate is degasified at about 100° C., and after mixing with about 30 parts of isobutyl 4-chloro-3,5-diamino-benzoate, the mixture is rapidly poured into molds.

The product can be removed from the mold after about 6 minutes. The molded product is hardened for about 24 hours at about 100° C. and has the following mechanical properties.

| | Example 61 |
|---|---|
| Tensile strength (DIN 53504) (kg./cm.²) | [1] 350 [1] 325 |
| Elongation at break (DIN 53504) (percent) | [1] 600 [1] 610 |
| Permanent elongation 1 min. after tearing (percent) | [1] 25 [1] 29 |
| Ring structure (kg.) | 43   42 |
| Shore hardness D (DIN 53505) | 48   56 |
| Elasticity (DIN 53512) (percent) | 37   39 |

[1] Determined on the ring.

EXAMPLE 64

About 66.5 parts of trimethylolpropane and about 53 parts of diethylene glycol are added dropwise to about 452 parts of 2,4-tolylene diisocyanate at from about 40° C. to about 50° C. under nitrogen. After about 2 hours, about 550 parts of the prepolymer of Example 51 are added. After about 24 hours storage, the prepolymer has an NCO content of about 12% and a viscosity of about 1400 cp. at about 90° C.

By using the prepolymers of Examples 51 to 58 and 64 either alone or in admixture, hard transparent elastomers having the mechanical properties shown in Table 4 are obtained in a manner analogous to Example 59 using the recipes shown in Table 4.

tion of about 30.5 parts of isobutyl 4-chloro-3,5-diaminobenzoate. The melt is poured into molds and hardened at about 100° C. After about 24 hours, the following mechanical properties are obtained.

Tensile strength (DIN 53504) (kg. wt./cm.$^2$) _____ 355
Elongation at break (DIN 53504) (percent) _____ 352
Shore hardness D (DIN 53505) _____ 57
Elasticity (DIN 53512) (percent) _____ 39

Although the invention has been described in considerable detail in the foregoing, such detail is solely for the purpose of illustration. Variations can be made in the invention by those skilled in the art without departing from the spirit and scope of the invention except as is set forth in the claims.

TABLE 4

| Parts of prepolymer of example | | Parts of prepolymer of Example 64 | Parts of isobutyl 4-chloro-3,5-diaminobenzoate | Tensile strength [1] (kg. wt./cm.$^2$) | Elongation at break [1] (percent) | Elasticity (DIN 53512) (percent) | Shore hardness D (DIN 53505) |
|---|---|---|---|---|---|---|---|
| Example: | | | | | | | |
| 65 | 175, Example 54 | | | 27.6 | 747 | 540 | 39 | 56 |
| 66 | 177, Example 55 | | | 27.1 | 681 | 527 | 40 | 56 |
| 67 | 174, Example 56 | | | 27.4 | 541 | 477 | 40 | 57 |
| 68 | 176.8, Example 57 | | | 27.8 | 668 | 551 | 40 | 56 |
| 69 | 140 | 46, Example 58 | | 29.3 | 676 | 569 | 42 | 54 |
| 70 | 120 | 51.5, Example 53 | 5 | 30.1 | 731 | 493 | 43 | 59 |
| 71 | 120 | 40.8, Example 53 | 15.5 | 30.1 | 763 | 481 | 41 | 59 |
| 72 | 120 | | 57.3 | 30.1 | 539 | 349 | 43 | 60 |

[1] DIN 53504.

EXAMPLE 73

About 114 parts of a polyester of adipic acid and hexanediol (OH number 133) are dehydrated under vacuum at about 130° C. about 36 parts of 2,4-tolylene diisocyanate are added at about 80° C. After about 4 hours at about 80° C., about 30.5 parts of the prepolymer of Example 52 are added. The mixture is degasified at about 100° C. by applying a vacuum. About 30.8 parts of isobutyl 4-chloro-3,5-diaminobenzoate are stirred in as a melt at about 100° C., and the melt is poured into preheated molds after about 30 seconds. After about 24 hours storage at about 100° C., the following mechanical properties are obtained.

Tensile strength (DIN 53504) (kg. wt./cm.$^2$) _____ 622
Elongation at break (DIN 53504) (percent) _____ 319
Shore hardness D (DIN 53505) _____ 64
Elasticity (DIN 53512) (percent) _____ 31

EXAMPLE 74

About 120 parts of a polytetramethylene ether glycol (OH number 116) are dehydrated in a vacuum at about 130° C. About 35.2 parts of 2,4-tolylene diisocyanate are added at about 80° C. After about 2 hours, about 25.3 parts of the prepolymer of Example 52 are added and degasified at about 100° C. by application of a vacuum. After the addition of about 30 parts of isobutyl 4-chloro-3,5-diaminobenzoate, the melt is poured into molds. The product can be removed from the molds after about 10 minutes at about 100° C. After about 24 hours storage at about 100° C., the following mechanical properties are obtained.

Tensile strength (DIN 53504) (kg. wt./cm.$^2$) _____ 518
Elongation at break (DIN 53504) (percent) _____ 414
Shore hardness D (DIN 53505) _____ 54
Elasticity (DIN 53512) (percent) _____ 42

EXAMPLE 75

About 117 parts of a polypropylene ether glycol-(1,3) (OH number 110) are dehydrated at about 130° C. by application of a vacuum. About 33 parts of 2,4-tolylene diisocyanate are added at about 80° C. about 29.5 parts of the prepolymer of Example 52 are added after about 24 hours at about 80° C. Degasification is then carried out at about 100° C. by application of a vacuum and the melt is homogenized for about 30 seconds after the addition of about 30.5 parts of isobutyl 4-chloro-3,5-diaminobenzoate.

What is claimed is:

1. A polyurethane elastomer prepared by a process comprising reacting an organic compound having at least two hydroxyl groups and a molecular weight of from about 800 to about 5000, an organic diisocyanate and an aromatic diamine chain-extending agent, said aromatic diamine containing an ester group wherein the amino groups are in the meta- or para-position to the ester group and containing a substituent selected from the group consisting of halogen or an alkoxy group having from 1 to 4 carbon atoms in the ortho-position to at least one amino group.

2. The elastomer of claim 1 wherein the reaction is conducted in the presence of an organic compound having at least two hydroxyl groups and a molecular weight of from about 50 to about 500.

3. The elastomer of claim 2 wherein the compounds having at least two hydroxyl groups and a molecular weight of from about 800 to about 5000 and the compounds having at least two hydroxyl groups and a molecular weight of from about 50 to about 500 are reacted with the organic diisocyanate such that the free diisocyanate content in the reaction mixture is less than about 10 percent by weight, prior to reaction with the aromatic diamine chain-extender.

4. The elastomer of claim 1 wherein the diisocyanate component used is a reaction product of an organic diisocyanate and a compound having at least two hydroxyl groups and a molecular weight of from about 50 to about 500.

5. The elastomer of claim 4 wherein the diisocyanate component is a reaction product of an organic diisocyanate with a compound having at least two hydroxyl groups and a molecular weight of from about 50 to about 500 said compound selected from the group consisting of neopentyl glycol, 1,2-propylene glycol, 1,3-butylene glycol, diethylene glycol, triethylene glycol, dipropylene glycol, tripropylene glycol, and thiodiglycol.

6. The elastomer of claim 5 wherein the compounds having at least two hydroxyl groups and a molecular weight of from about 50 to about 500 contain up to about 25 percent of weight of a compound which contains at least three hydroxyl groups.

7. The elastomer of claim 6 wherein the compound which contains at least three hydroxyl groups is trimethylol propane.

8. The elastomer of claim 1 wherein the diamine has the general formula

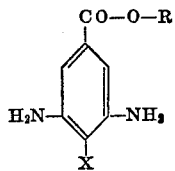

in which R is an alkyl radical having from 1 to 20 carbon atoms which optionally can contain oxygen atoms, an aryl-, aralkyl- or cycloalkyl radical and X is selected from the group consisting of an alkoxy radical having from 1 to 4 carbon atoms or a halogen atom.

9. The elastomer of claim 1 wherein the diamine has the formula

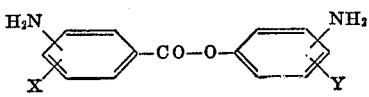

wherein X is selected from the group consisting of hydrogen or halogen atom and Y is a halogen atom.

10. The elastomer of claim 1 wherein the diamine has the formula

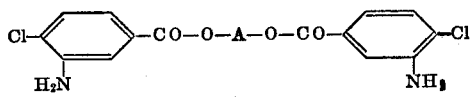

wherein A is a divalent alkylene radical having from 2 to 6 carbon atoms which may contain oxygen, sulfur or —N(R)— (R=$C_1$-$C_4$-alkyl).

11. The elastomer of claim 1 wherein the diamine has the formula

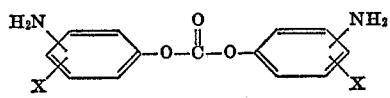

wherein each X is a halogen atom and in which at least one substituent X is in the ortho-position to the amino group.

12. The elastomer of claim 1 wherein the diamine has the formula

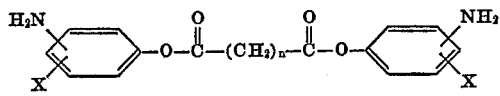

wherein $n$ is a number of from 0 to 4 and each X is a halogen atom and in which at least one substituent X is in the ortho-position to the amino group.

13. The elastomer of claim 8 wherein the diamine has the formula

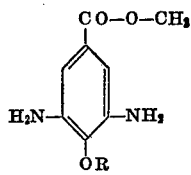

wherein R is selected from the group consisting of —$CH_3$, —$C_2H_5$, —$C_3H_7$ or —iso-$C_3H_7$.

14. The elastomer of claim 8 wherein the diamine has the formula

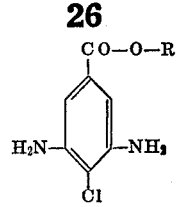

wherein R is selected from the group consisting of $C_3H_7$, n—, iso-$C_4H_9$, $C_5H_{11}$, iso-$C_5H_{11}$, —$C_6H_{13}$ $-CH\begin{Bmatrix}CH_3 \\ CH_2-CH_2(CH_3)_2\end{Bmatrix}$, $-CH_2-CH-(C_2H_5)_2$, —$C_7H_{15}$ —$C_8H_{17}$, —$CH_2-CH\begin{Bmatrix}C_2H_5 \\ C_4H_9\end{Bmatrix}$ —$CH_2-\underset{CH_3}{\underset{|}{C}}-C_2H_5$, —$CH_3-CH_2-\underset{CH_3}{\underset{|}{C}}-C_4H_9$ $C_{10}$—$H_{21}$, —$C_{12}H_{25}$, —$C_{14}H_{29}$, —$C_{16}H_{33}$, —$C_{18}H_{37}$, —$C_6H_5$

—$C_6H_{11}$, —⟨H⟩—$C(CH_3)_3$, —$CH_2CH_2$—O—$C_4H_9$

—$CH_2$—$CH_2$—O—$CH(CH_3)_2$ or —$CH_2$—$CH_2$—O—$CH_2$—$CH_2$—O—$C_4H_9$

15. The elastomer of claim 9 wherein the diamine has the formula

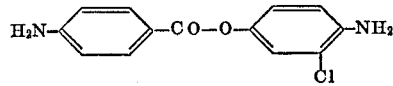

16. The elastomer of claim 9 wherein the diamine has the formula

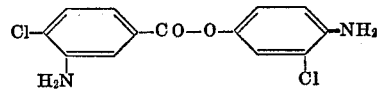

17. The elastomer of claim 10 wherein the diamine has the formula

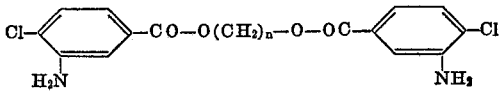

wherein $n$ is a number of from 2 to 6.

18. The elastomer of claim 11 wherein the diamine has the formula

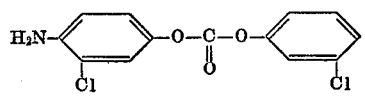

19. The elastomer of claim 12 wherein the diamine has the formula

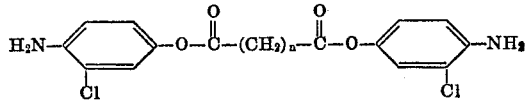

wherein $n$ is a number of from 0 to 4.

References Cited
UNITED STATES PATENTS 3,457,234  7/1969  Gianatasio _____ 260—75 NH
3,095,399  6/1963  Muller et al. _____ 260—471 R DONALD E. CZAJA, Primary Examiner M. J. WELSH, Assistant Examiner U.S. Cl. X.R.

260—471 R